(12) United States Patent
Beyer

(10) Patent No.: US 6,191,948 B1
(45) Date of Patent: Feb. 20, 2001

(54) POWER SUPPLY DEVICE

(75) Inventor: Lothar Beyer, Neumarkt (DE)

(73) Assignee: Ellenberger & Poensgen GmbH, Altdorf (DE)

( * ) Notice: Under 35 U.S.C. 154(b), the term of this patent shall be extended for 0 days.

(21) Appl. No.: 09/223,192

(22) Filed: Dec. 30, 1998

(30) Foreign Application Priority Data

Jan. 29, 1998 (DE) .............................. 198 04 833
Feb. 14, 1998 (DE) .............................. 198 06 081

(51) Int. Cl.[7] ..................................................... H05K 7/14
(52) U.S. Cl. ........................... 361/729; 361/624; 361/611; 361/614; 361/637; 361/648; 174/68.2; 174/70 B; 174/71 B; 174/88 B; 174/72 B; 363/142; 307/147; 307/150
(58) Field of Search ..................................... 361/729, 624, 361/728, 727, 611, 614, 637, 648, 725, 650; 174/68.2, 70 B, 71 B, 88 B, 72 B; 363/142, 144; 307/147, 150

(56) References Cited

U.S. PATENT DOCUMENTS

| | | |
|---|---|---|
| 2,902,631 | 9/1959 | McRoberts et al. . |
| 3,924,161 * | 12/1975 | Olashaw et al. ...................... 361/611 |
| 4,307,304 * | 12/1981 | Kovatch et al. ...................... 307/147 |
| 5,089,937 * | 2/1992 | Carubba et al. ...................... 361/732 |
| 5,162,616 * | 11/1992 | Swaffield et al. ................... 174/99 B |
| 5,172,310 * | 12/1992 | Deam et al. ......................... 363/144 |
| 5,216,575 * | 6/1993 | Tanimizu ............................. 361/611 |
| 5,245,527 * | 9/1993 | Duff et al. ........................... 363/131 |
| 5,629,831 * | 5/1997 | Eggert et al. ........................ 361/624 |
| 5,745,338 * | 4/1998 | Bartolo et al. ....................... 361/637 |
| 5,847,921 * | 12/1998 | Kim ..................................... 361/634 |
| 5,870,277 * | 2/1999 | Girard et al. ........................ 361/627 |
| 5,969,938 * | 10/1999 | Byrne et al. ......................... 361/678 |

FOREIGN PATENT DOCUMENTS

| | | |
|---|---|---|
| 44 40 602 | 10/1987 | (DE) . |
| 0 252 512 | 7/1987 | (EP) . |

* cited by examiner

Primary Examiner—Jeffrey Gaffin
Assistant Examiner—David Foster
(74) Attorney, Agent, or Firm—Venable; Gabor J. Kelemen

(57) ABSTRACT

A device, used in particular in telecommunications technology to supply power to parallel-connected, electrical loads has side-by-side arranged potential lines. These are secured inside a connecting housing, with connections for supplying the operating potential. The connections supply plug-in modules for connecting individual loads, which modules are fitted against the connecting housing in longitudinal direction of the potential lines. The potential lines are configured as rigid, parallel bus bars that project on a side from the connecting housing. With the aid of passages that make contact with the bus bars, the plug-in modules are fitted side-by-side onto the bus bars, such that they fit against the connecting housing or against each other, and are frictionally secured.

21 Claims, 3 Drawing Sheets

POWER SUPPLY DEVICE

CROSS REFERENCE TO RELATED APPLICATION

This application claims the priority of German Application Nos. 198 04 833.5 filed Jan. 29, 1998 and 198 06 081.5 filed Feb. 14, 1998, which are incorporated herein by reference.

BACKGROUND OF THE INVENTION

The invention relates to a power supply device, used in particular in telecommunications technology. Such a device supplies power to parallel connected, electrical loads by means of side-by-side potential lines and is known from European published patent application number 252 512. The plug-in modules used for such devices have the same basic design as an embodiment disclosed in German patent number 40 40 602. The plug-in module disclosed therein is provided with four parallel-connected outgoing current lines, protected by four side-by-side arranged protective switches that are plugged into the outside of the plug-in module lid. The protective switches are plugged into a base connector, such that they are lined up with their broad sides adjacent to each other. The protective switches have a compact design.

An arrangement with rigid, parallel bus bars is known from a catalog by the company Phoenix Contact GmbH Blomberg, Germany, issue 93/94, relating to the "Innovation in Interface I Bonding Technique," pp 68, 69. In this arrangement, connecting terminals are pushed one after another onto the separate bus bars. However, these connecting terminals are not plug-in modules.

SUMMARY OF THE INVENTION

It is an object of the invention to design a device for supplying power to parallel connected, electrical loads by means of side-by-side arranged potential lines having a connecting housing that contains connections for supplying the operating potential and plug-in modules that fit against the connecting housing for connecting individual loads.

Since the number of outgoing lines can vary considerably in devices of the above-mentioned type, the device according to the invention can be adapted to a varying number of outgoing current supply lines in a simple production-technological and cost-effective manner.

This object is solved by providing rigid, parallel bus bars which project from one side wall of the connecting housing as the potential lines and plug-in modules having passages that make contact with the bus bars. The bus bars for the potential lines in this case project like skewers from one side of the connecting housing, onto which the necessary number of plug-in modules are arranged, such that they make contact with the housing and/or are pushed together like pieces of meat for roasting on a skewer. Once the plug-in modules are threaded onto the bus bars and slid into place, passages of the plug-in modules automatically make electrical contact with the bus bars. A signal current, an auxiliary current or a ground potential, which are present in addition to the potential current, can be transmitted from the connecting housing to the plug-in modules with the aid of a standard plug-in connection.

According to the invention, it is only necessary to have the bus bars cut to various lengths depending on the number of desired plug-in modules. These represent the only components of the device according to the invention, which vary depending on the number of power supply connections that must be provided. This single variation can be realized in a simple manner.

BRIEF DESCRIPTION OF THE DRAWINGS

The invention as well as other features, important to the realization, are explained in further detail with the aid of the figures shown in the exemplary embodiments, wherein.

DETAILED DESCRIPTION OF THE INVENTION

Figures 1, 2:
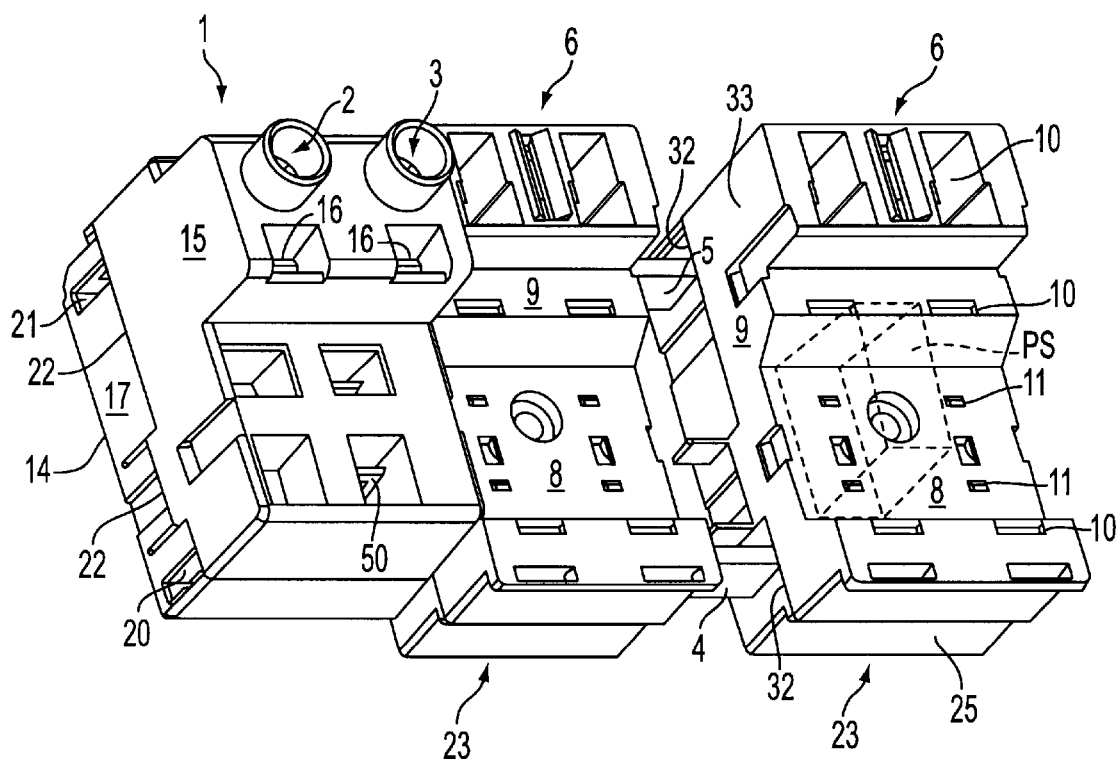
FIG. 1 shows a perspective view from the top of a device according to the invention with a connecting housing, a plug-in module fitted against it and an additional plug-in module, which has already been threaded onto the bus bars, but has not yet been pushed far enough to make contact with the first plug-in module already in the end position.
FIG. 2 shows a perspective view from above of the lower part of the connecting housing and a plug-in module already lined up against the connecting housing, with both housing lids removed.

As shown in FIG. 1, the basic element of the device according to the invention is the connecting housing 1. This housing contains the connections 2, 3 for the operating potential and their line interfaces which are arranged inside connecting housing 1 for electrical connection to the bus bars 4, 5. Bus bars 4, 5 project from the right side of connecting housing 1 in a direction 7 as shown in FIG. 2 and receive plug-in modules 6 as shown in FIGS. 1–2. The direction 7 for lining up the plug-in modules 6 against the connecting housing 1 extends parallel to the longitudinal direction of bus bars 4, 5, particularly in the plug-in region located outside of connecting housing 1.

In this embodiment, the surface 8 of housing lid 9 of a housing for plug-in modules 6 contains a recess with a trapezoidal cross section which, for example, is designed to accommodate protective switches PS that individually protect each load connection. The plug-in modules are lined up in a row in longitudinal direction 7. One manner in which the protective switches PS are positioned on the plug-in modules 6 corresponds to the positioning shown with dash-dot line in the Figure of German Patent No. 44 40 602 as such is a standard protective switch. The surface 8 of lid 9 for a plug-in module 6 contains a varied number of through plug-in openings 10, 11, e.g. to accommodate contact reeds which project downward from the base of such a standard protective switch and for the contacting of these reeds with corresponding mating contacts. The plug-in openings 10 in this case function to make electrical contact with the operating potential of bus bars 4, 5 and the plug-in openings 11 function to make electrical contact with a signal current, an auxiliary current, a ground contact, or the like.

Figure 6:
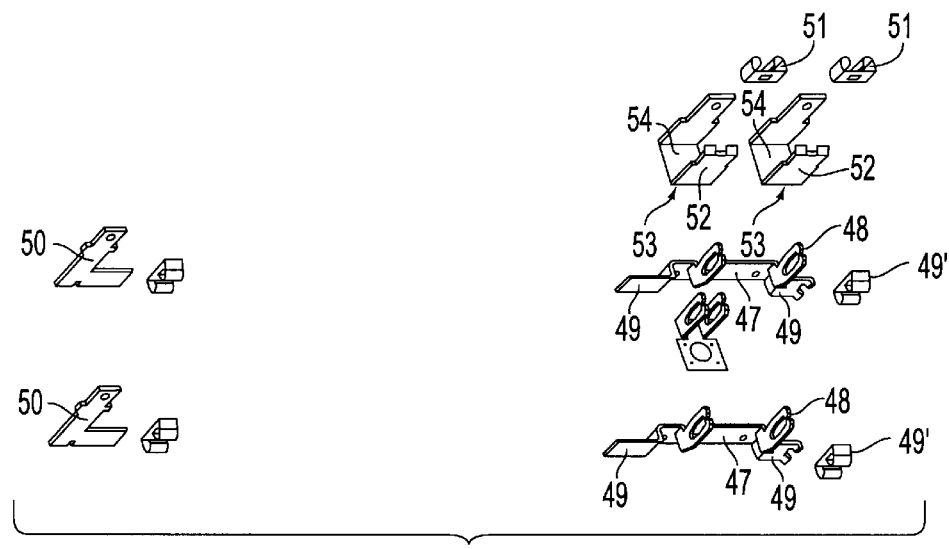
FIG. 6 shows an exploded illustration and corresponding association of the current carrying and contacting elements, shown in FIGS. 3–5, for the additional transmission of a signal current, an auxiliary current, the ground potential or the like from the connecting housing to protective switches that are not shown.

The connector couplings 12, 13 FIG. 6 of bus bars 4, 5 that are connected to the connections 2, 3 of connecting housing 1, are essentially housed in a shell-shaped lower housing part 14 of connecting housing 1. These connector couplings have upward pointing rectangular connectors or flat-cable plugs 16 on the cover surface of their input region, which project through the lid 15 of connecting housing 1 and can be contacted from the outside by fitting them into openings that are not shown here.

With their ends positioned in the lower housing part 14, bus bars 4, 5 are welded to connector couplings 12, 13. In this manner bus bars 4, 5 with a rectangular cross section are positioned upright, in a region corresponding to a height level of lower part 14 of connecting housing 1. Thus, bus bars 4, 5 do not extend upward, past the separating joint between lower part 14 and lid 15 of the connecting housing 1. Bus bars 4, 5 are therefore fixedly secured parts on edge in the lower part 14 of connecting housing 1. Further, bus bars 4, 5 may be standard parts having approximately the same cross section over their complete length. The cross section of bus bars 4, 5 cannot interfere with the threading or sliding of plug-in modules 6 onto the bus bars 4, 5, so that the plug-in modules can make contact with connection housing 1 and/or another plug-in module.

The lower part 14 of connecting housing 1 contains side walls 17 with through slots 20, 21 for bus bars 4, 5, which slots are aligned approximately perpendicular to the housing bottom 18 and start from an upper edge 19 of each side wall 17. Both side walls 17 therefore have through slots 20, 21 that extend from upper edge 19 downward. Counter to the embodiments shown in the Figures, bus bars 4, 5 therefore do not necessarily project from the connecting housing 1 and the connector couplings 12, 13 only to the right, but can also project to the left, so as to permit the lining up from the other side. In any case, the design is such that the length or height of through slots 20, 21 approximately corresponds to the dimension for the longer rectangular side of the cross section for bus bars 4, 5. Thus, the positioning of bus bars 4, 5 in a respective through slot 20, 21 is definitely secured by a lid 15, which closes off through slots 20, 21 with the bottom edge 22 of its side walls. Lid 15 thereby ensures the positioning of the bus bars 4, 5 and thus also their connector couplings 12, 13 within the lower housing part 14 of connecting housing 1. Through slots 20, 21 may be dimensioned to match the cross-sectional shape of bus bars 4, 5, so that their edges also contribute to the positioning.

The bus bars 4, 5 have a varied length, depending on the number of plug-in modules 6 that must be lined up against the connecting housing 1. They project from the right side wall 17 of lower part 14 of connecting housing 1, in the manner of two skewers, aligned parallel to each other and perpendicular to the side walls 17.

Figure 3:
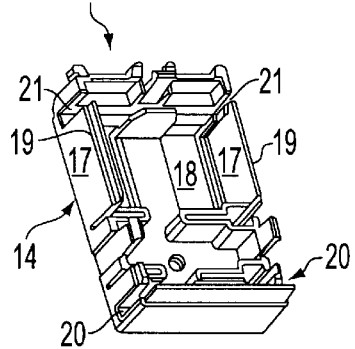
FIG. 3 shows a perspective view from above of a lower part of the connecting housing with contacting elements removed.
Figure 4:
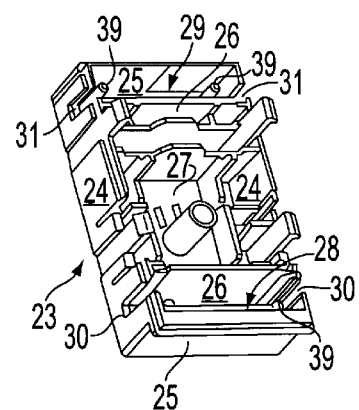
FIG. 4 shows a perspective view from above, analogous to FIG. 3, of a lower part of a plug-in module with contacting elements removed.

The housing for plug-in modules 6 has a shell-shaped lower part 23, which can be closed off with a lid 9. Essentially, it has a similar design as the lower part 14 of connecting housing 1. Looking at FIG. 4, of particular importance are the two passages 28, 29 for bus bars 4, 5, which are delimited by the side walls 24 and the front walls 25, as well as inside wall elements 26 and the bottom 27 of lower part 23. The passages 28, 29 can be accessed from the two side walls 24, via the through slots 30, 31. These slots 30, 31 in the lower module part 23 correspond to the through slots 20, 21 of lower part 14 in connecting housing 1. That is, they are used to insert or guide through the bus bars 4, 5 and accordingly have the same dimensions as the through slots 20, 21 (shown in FIGS. 1 and 3) of lower part 14 of connecting housing 1.

Also, as can be seen from FIG. 1, the lower edges 32 of side walls 33 for lid 9 of plug-in module 6 have the same positioning effect on the bus bars 4, 5 in the region of passages 28, 29 through the lower part 23 of a plug-in module 6, as do the lower edges 22 of the side walls for lid 15 of connecting housing 1 in the respective region.

Figure 5:
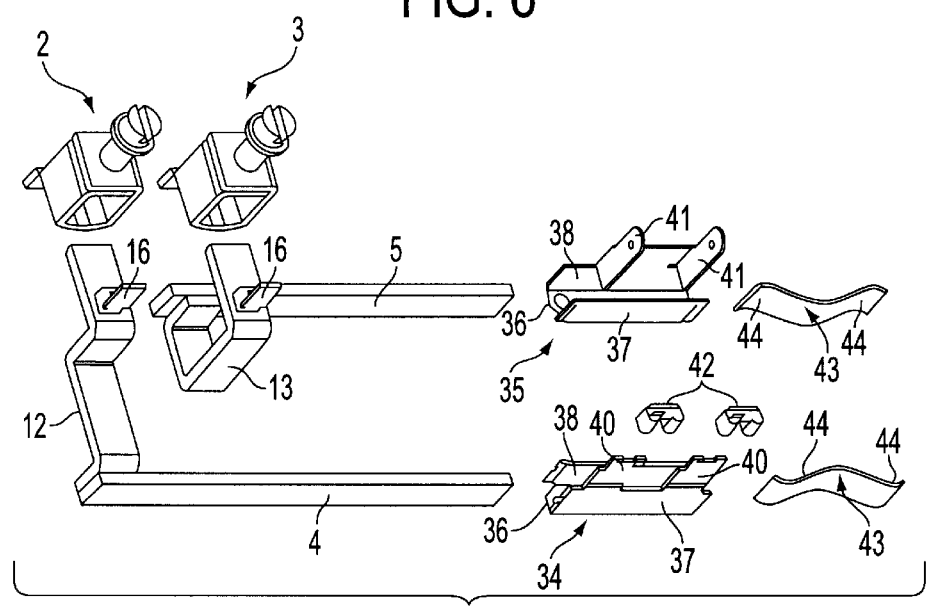
FIG. 5 shows an exploded, perspective view of the two bus bars, associated with the lower housing parts according to FIGS. 3 and 4, and the contacting elements, cooperating with these, for feeding in the potential current and making contact with the plug-in modules.

Looking at FIG. 5, opposing contacts 34, 35 have an approximately U-shaped cross section. These contacts 34, 35 are inserted into respective passages 28, 29 of a plug-in module 6. They are positioned such that the U-shaped base 36 rests on the bottom 27 of passages 28, 29. Their U legs 37, 38 rest against the front walls 25 or the wall elements 26 of the lower part 23. The length of opposing contacts 34, 35 is relative to the longitudinal direction 7 of bus bars 4, 5 and is such that based on their dimensions alone, the opposing contacts are secured in position inside the passages 28, 29 of lower part 23. U-shaped base 36 has through openings in the form of punching holes, shown in FIG. 5, with which base 36 can be fitted over fixing projections 39 that point upward in the manner of columns from bottom 27 of lower part 23, thereby securing opposing contacts 34, 35 additionally in position.

Reeds 40, 41, which project outward in the direction of lid 9, are formed onto one of the U legs 37, 38 of opposing contacts 34, 35. In the assembled position, these reed contacts are fitted inside the plug-in openings 10 of lid 9, such that they are accessible from the outside. Consequently, they can be accessed from the outside by fitting prong receiving units 42 for the electrical lines over them.

The opposing contacts 34, 35 and their reeds 40, 41 are formed from a single, stamped metal part that is bent into its final form. The stamped metal part can be produced from a contacting metal that is not resilient in itself, e.g. a copper alloy. In that case, a leaf spring 43 that is wave-shaped and convexly bent in longitudinal direction 7, is provided in the space between the two U legs 37, 38. The convex bulging of this leaf spring acts upon the inside of a U leg 37, 38 and serves to increase the contact pressure, meaning to ensure a sufficient contact between the opposing contacts 34, 35 and the associated bus bars 4, 5. The fixing projections 39 serve to secure the position of leaf spring 43, which is inserted loosely from above into the space between the U legs 37, 38. In order to secure the position, these fixing projections extend into the concave regions 44 of leaf springs 43, thus functioning to counter a displacement of the leaf springs 43 in longitudinal direction 7 within the opposing contacts 34, 35, without reducing the contact-making spring mobility.

Figure 7:
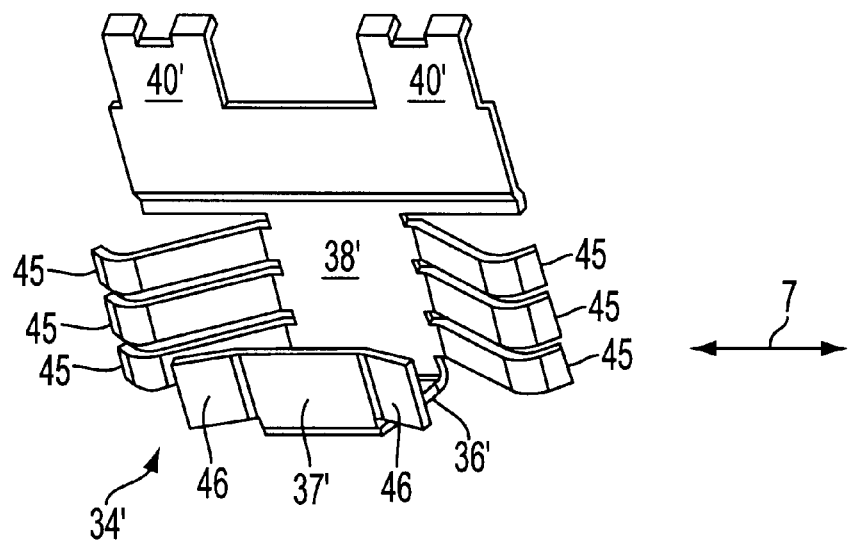
FIG. 7 and FIG. 8 show alternative embodiments of contacting elements for contacting the bus bars, which elements are embedded in the plug-in module passages.
Figure 8:
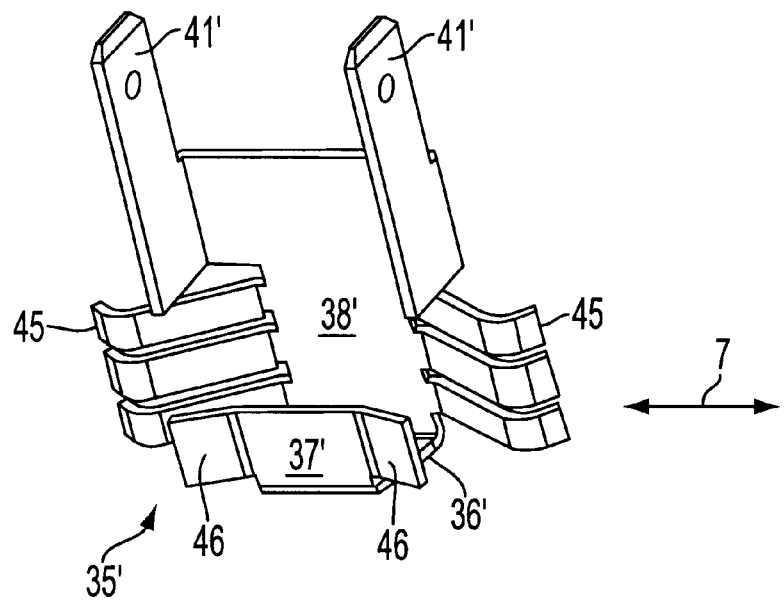

While a preferred embodiment is shown in FIG. 5, where opposing contacts 34, 35 consist of two parts, as an additional leaf spring 43 is used, it is also possible to have a one-piece design, as described with the aid of FIGS. 7 and 8. The opposing contacts 34', 35' are basically also designed in the shape of a U, the same as the opposing contacts 34, 35. For that reason, the same reference numbers are used as for the FIG. 5, with the exception that they are primed. In order to form a unitary spring and contact combination with pressure tabs 45 in the direction toward the other U leg 37' (FIGS. 7, 8), the U leg 38' of opposing contacts 34', 35' is bent on both sides positioned in longitudinal direction 7, meaning in the throughput direction for bus bars 4, 5. In this case, the stamped metal part of opposing contact 34', 35' can be made of an at least slightly elastic contact material. The other U leg 37' is provided on both sides with a correspondingly bent pressure tabs 46, which in this case functions more as a slanted guide surface for inserting bus bars 4, 5 in the manner of skewers or for fitting the plug-in modules 6 onto the bus bars.

In addition to the bus bars 4, 5 as operating potential lines, the plug-in modules 6 also comprise additional line elements or connection elements for conducting a signal current, an auxiliary current, a ground potential or the like, in short "an auxiliary current potential," as shown in the exploded view on the right side in FIG. 6. Connecting bars 47 (FIG. 6) are embedded in corresponding recesses in the lower housing part 23 of plug-in module 6 and extend parallel between the bus bars 4, 5 or the passages 28, 29. Toward the top surface 8 of lid 9, meaning toward the plug-in side of, for example, a protective switch, these connecting bars are provided with reed contacts 48 for potential current which are analogous to the plug-connection elements or reed contacts 40, 41. In the assembled position for plug-in module 6, reed contacts 48 are positioned inside the plug-in openings 11 of lid 9, similar to the manner in which the reed contacts 40, 41 of opposing contacts 34, 35 fit into the plug-in openings 10. At the ends pointing in longitudinal direction 7, the connecting bars 47 have plug-and-socket contacts 49 which in conjunction with prong receiving units 49' ensure a plug-in contact with the connecting housing 1 after a plug-in module 6 is slid onto the bus bars 4, 5 and fits flush against the connecting housing 1. The connecting bars 47 and reed contacts 48 further make electrical contact with the connecting housing 1 via the plug-in elements, designed as rectangular plugs 50, which correspond to the plug-and-socket contacts 49.

Reeds 52, which project outward in the direction of lid 9, are formed onto the U leg 53 of the opposing contact 54. In the assembled position, these reed contacts 52 are fitted inside the lower plug-in openings 10 of lid 9 (FIG. 1). Consequently, they can be accessed from the outside by fitting prong receiving units 51 for the electrical line over them. Their position inside the housing 23 is to see in FIG. 2.

The device according to the invention therefore has a modular design. However, it is delivered fully assembled by the manufacturer, with the ordered number of plug-in modules 6, which in the case of the exemplary embodiment, are equipped for respectively two line connections and thus also for accommodating two protective switches on the surface 8 of its lid 9. The bus bars 5 are cut to specific lengths, corresponding to the number of plug-in modules 6, and are welded to the connector couplings 12, 13. The number of plug-in modules 6 that must be considered is slid or fitted onto the bus bars 4, 5 in longitudinal direction 7. In the fully plugged-in position, the modules 6 are fitted tightly against each other or against the connecting housing 1. The opposing contacts 34, 35 or 34', 35' are designed such that they do not present an obstruction when bus bars 4, 5 are pushed through the passages 28, 29 in plug-in modules 6 while still ensuring a secure contacting as well as a secure positioning in the location in the form of a frictional connection. With the design of opposing contacts 34', 35' according to FIGS. 7 and 8, for example, the pressure tabs 46 of U legs 37' function as guide surfaces to ensure an unhindered pushing through of bus bars 4, 5.

The plug-in modules 6 are designed such that they can be fitted either from the left or from the right side against a connecting housing 1. The opposing contacts 34, 34' and 35, 35' are designed such that they are suitable for the opposite contacting of a bus bar 4 as well as a bus bar 5. Accordingly, the housing for plug-in module 6 for the most part has a symmetrical design, so as to require as few individual parts as possible. The opposing contacts 34, 34' or 35, 35' are designed and realized such that they make it possible to have a continuous, low-ohmic electrical connection, which permits a load of up to 30 A for the realized dimensions without causing an unacceptable heating up. The connections 2, 3 of bus bars 4, 5 are electrically connected via sheathed terminals (FIG. 5).

It will be understood that the above description of the present invention is susceptible to various modifications, changes and adaptations, and the same are intended to be comprehended within the meaning and range of equivalents of the appended claims.

What is claimed is:

1. A device for supplying power to parallel connected, protective switches by means of side-by-side arranged potential lines, said device comprising:

a connecting housing in which connections for supplying an operating potential are housed;

at least two rigid, parallel bus bars which project from a side wall of said connecting housing, said bus bars being the potential lines; and plug-in modules for electrically connecting individual protective switches to said connecting housing, said plug-in modules having a module housing with passages therein, said passages receiving said bus bars and extending through each said module housing so that at least two plug-in modules can be arranged in a row from the connecting housing, said plug-in modules making electrical contact with said bus bars and one of the at least two plug-in modules being fitted against said connecting housing and the second of the at least two plug-in modules being fitted against said one plug-in module, said plug-in modules being frictionally secured on said bus bars.

2. A device according to claim 1, further comprising connecting bars for transferring at least one of a signal current, an auxiliary current and a ground potential, said connecting bars being arranged in the plug-in modules, parallel to the passages for bus bars; the connecting bars correspond to the bus bars with respect to their cross-sectional alignment inside the module housing; and plug-and-socket contacts for conducting the at least one signal current and potential located on side walls of the connecting housing and plug-in module, through which the passages for the potential lines extend.

3. The device according to claim 1 which is used in telecommunications technology.

4. A device according to claim 1, wherein said bus bars have a uniform cross section over their total length.

5. A device according to claim 4, wherein said bus bars have a rectangular cross section.

6. A device according to claim 1, wherein said connecting housing has a bottom and said bus bars extend along the bottom of the connecting housing and are aligned approximately perpendicularly to the bottom of the connecting housing.

7. The device according to claim 6, wherein the bus bars have a cross section with a longer side, said longer side being aligned approximately perpendicular to the bottom of the connecting housing.

8. A device according to claim 1, wherein the module housing of a plug-in module includes a shell-shaped lower part having an opening edge; a lid; and a separating joint between the opening edge of the lower part and the lid extending approximately at a right angle to a plane through which one of the bus bars extends; and wherein the passages have limiting walls which extend through the module housing which are limited by the opening edge of the lower part as well as the lid.

9. A device according to claim 8, wherein said bus bars are positioned such that they fit against the limiting walls of the passages that extend through the module housing.

10. A device according to claim 8, wherein the lower part of the plug-in module includes a bottom and slotted openings which extend from the opening edge of the lower part in the direction of the bottom and the bus bars are positioned in the slotted openings, said slotted opening aligning with a respective passage of the plug-in module.

11. A device according to claim 8, wherein, in an assembled position, the lid of the module housing secures at least one bus bar in its position inside a slotted opening in the lower part.

12. A device according to claim 8, further comprising plug-in openings located in the lid for establishing plug-and-socket contacts which extend through the lid.

13. A device according to claim 8, further comprising opposing contacts having an approximately U-shaped cross section with U-legs, said opposing contacts being inserted in a respective passage that extends through the lower part of the module housing, and wherein said bus bars rest between the U legs of the opposing contacts in the manner of knife contacts.

14. A device according to claim 13, further comprising a leaf spring with a convex curvature that is inserted between the U legs of the opposing contact and acts upon the inside of a U leg to increase the contact pressure.

15. A device according to claim 13, further comprising reed contacts which project outward in the direction of the lid, and are formed onto one of the U legs for a plug-and-socket connection that extends through the lid.

16. A device according to claim 15, wherein the opposing contacts and the reed contacts are formed from a single stamped metal part which is bent to form its final position.

17. A device according to claim 13, wherein the opposing contacts extend essentially over a complete length of the lower part of the module housing.

18. A device according to claim 17, further comprising a unitary contact and spring combination including pressure tabs formed on at least one U leg of the opposing contacts, said pressure tabs being bent in a direction toward the other U leg, said at least one U leg being bent on at least one side and positioned in a through direction along one side of a respective passage.

19. A device according to claim 18, wherein both U legs of an opposing contact are bent in the same direction on at least one side.

20. A device according to claim 19, wherein the other U leg with at least one bent side that faces away from the bus bar is shorter in the through direction than the at least one U leg.

21. A device according to claim 1, wherein the at least two rigid, parallel bus bars project from a left side wall and a right side wall of said connecting housing; and a plurality of the plug-in modules can be arranged, in a row, from the left side wall and from the right side wall of the connecting housing.

\* \* \* \* \*